June 21, 1955 — J. A. ROEHRIG — 2,711,314

VEHICLE LEAF SPRING SUSPENSION

Filed April 29, 1952

INVENTOR.
JOHN A. ROEHRIG
BY
*William J. Ruano*
ATTORNEY

United States Patent Office 2,711,314
Patented June 21, 1955

2,711,314
VEHICLE LEAF SPRING SUSPENSION
John A. Roehrig, Pittsburgh, Pa., assignor of one-half to William M. Clark, Pittsburgh, Pa.
Application April 29, 1952, Serial No. 285,048
5 Claims. (Cl. 267—19)

This invention relates to a vehicle spring suspension and, more particularly, to a spring suspension of the type in which the effective length of the spring is automatically shortened as the result of an increase in weight on the vehicle frame, or as the result of tensioning or straightening of the spring caused by road irregularities, and for the purpose of stiffening the spring under such conditions so as to avoid the possibility of breakage of the end thereof.

It is known in the art to provide a vehicle spring suspension with helper or auxiliary springs, or to provide means for automatically varying the effective length of the spring as the result of loading conditions or road irregularities. However, conventional spring suspensions of these types have the outstanding disadvantage of being rather complicated in construction, many requiring radius rods or requiring shackle assemblies at both ends while others include a number of auxiliary or helper springs or parts which are relatively slidable, therefore subject to excessive wear from friction, also they are expensive to manufacture. In some types, a solid rolling shoe is used for varying the load carrying points on the leaf spring. However, such a shoe, being rigid, detracts appreciably from the softness of the ride.

An object of my invention is to provide a novel vehicle spring suspension which embodies means for automatically shortening the effective length of the spring as the result of an increase in load or as the result of road irregularities, which spring comprises parts which are relatively simple and economical to manufacture and assemble.

A further object of my invention is to provide, in a vehicle spring suspension, a shackle linkage means at the end of the leaf spring, which linkage includes a yieldable rolling member for not only shortening the length of the spring but for contributing its yieldability as a helper element or auxiliary spring in response to loading of the vehicle frame or rebound from road irregularities.

Other objects and advantages of the present invention will become apparent from a study of the following description taken with the accompanying drawing wherein.

Figure 1:
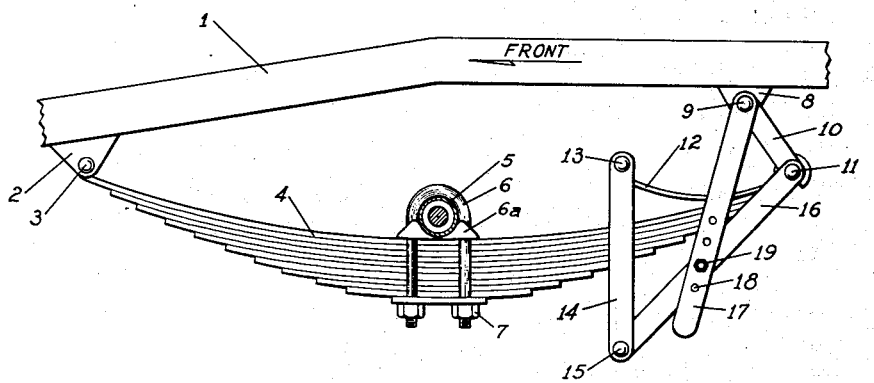
Figure 1 is a side elevation of a spring suspension for the rear wheels of an automobile and embodying the principles of my invention.
Figure 2:
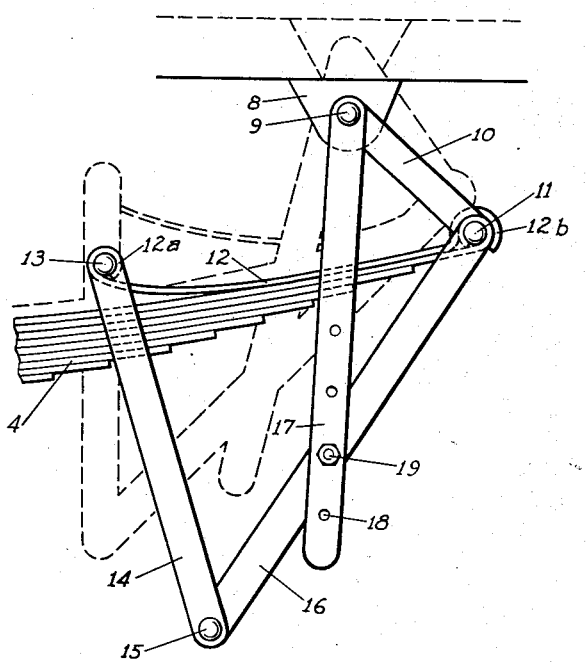
Figure 2 is an enlarged fragmentary view more clearly showing the novel features of the shackle mounting in Figure 1.

Referring more particularly to Figures 1 and 2 of the drawing, numeral 1 denotes a frame portion at the rear part of vehicle having a rigidly attached thereunderneath a spring supporting bracket or hanger 2 consisting of a pair of spaced parallel flanges between which extends a pivotal pin or bolt 3 for supporting the forward end of a multi-leaf spring 4. The direction of the front end of the vehicle is indicated by the arrow. The leaves of the spring are held together and the central portion of the spring 4 is mounted on the rear axle 5 by means of U bolts or clips 6 and bracket 6a which are rigidly held together by tightening of nuts 7. Underneath the rear portion of frame 1 is rigidly secured a bracket 8 similar to bracket 2 and through which extends a bolt 9 for pivotally mounting the upper end of a shackle 10. Shackle 10 may be about ½" shorter than a conventional shackle. The lower end of the shackle 10 is pivotally mounted by pin or bolt 11 to the rear end portion of the longest and uppermost leaf of spring 4.

An important feature of my invention resides in the construction and operation of the shackle linkage which includes an auxiliary spring 12 which is normally arcuate in shape, as shown in Figure 1, and having a radius substantially smaller than that of the top leaf so that only the portion thereof adjacent bolt 11 is in contact with the upper surface of the top leaf in spring 4. The rearmost end of the arcuate spring 12 which is denoted by numeral 12b is in the form of a partial loop or eye which encircles only a part of bolt 11, whereas the forward end portion 12a forms a complete loop about a bolt 13. Bolt 13 pivotally connects the forward end of arcuate spring 12 to the upper end of a shackle or link 14, the lower end of which is pivotally connected by the pin or bolt 15 to a link 16. The upper end of link 16 is pivotally connected to the bolt or pin 11. A link 17 is provided which has its upper end pivotally connected to bolt 9 and a lower portion pivotally connected to an intermediate part of link 16 by means of a bolt 19. By providing a plurality of holes 19 in the link 18, the effective length of link 18 may be varied, that is, the portion of the length of link 18 between its upper pivotal end and its point of connection to link 16 may be varied by selectively inserting bolt 20 through any of the holes 19, depending on loading conditions. For example, if a heavier load is to be carried, such as by hitching a trailer, a lower hole connection is used in order to provide greater initial contact between arcuate spring 12 and the upper leaf.

It should be noted that shackles 10 and 14 and links 16 and 17 are each formed of two spaced parallel elements, one on each side of spring 4.

Figure 3:
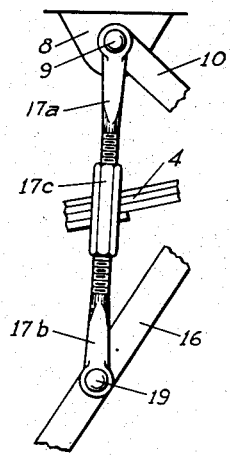
Figure 3 is an enlarged fragmentary view of a modified form of adjustable link which can be substituted for link 17 shown in Figures 1 and 2.

Figure 3 shows a modification of an adjustable link which may be substituted for link 17 in Figure 2. As shown in Figure 3, the link is in the form of a pair of oppositely threaded elements 17a and 17b whose threaded portions are screw-threadedly connected to a turnbuckle 17c. Thus, upon turning of the turnbuckle in one direction, the link 17a, 17b, 17c is shortened and by turning it in an opposite direction, it is lengthened, thus accomplishing the same purpose as selectively inserting bolt 19 in any of the holes 18 in the modification shown in Figure 2.

The operation of the spring suspension described hereinabove is as follows: Assume that the vehicle is lightly loaded or that the spring 4 has not become appreciably tensioned due either to loading or to an obstacle encountered by the wheels. The relative position of the shackle linkage will be as shown in Figure 1 or as shown in dotted lines in Figure 2, that is, with the arcuate spring 12 curved through a substantially smaller radius than the uppermost leaf of spring 4 and contacting the upper leaf only at the extreme rearward end portion adjacent bolt 11. With the shackle linkage in this position, a very soft ride is provided since substantially the entire length of the upper leaf of spring 4 comes into play. For all intent and purposes, the spring suspension would act practically the same as if links 14, 16 and 17 were omitted together with arcuate spring 12, that is, as if only the conventional shackle 10 were provided.

However, as the result of an increase of loading of a vehicle or of hitting of an obstruction by the rear wheels which would tend to bring frame 1 and leaf spring 4 closer together and to tension and straighten out the leaves of spring 4, the shackle linkage parts will eventually assume the position shown in full lines in Figure 2, that is, shackle 10 will assume a smaller angle relative to frame 1 and arcuate spring 12 will roll out to an arc of increased diameter and approaching the arc of the upper leaf of spring 4. Two highly important results are obtained from this action. The first is that by virtue of the rolling-like movement of spring 12 as it moves from the position shown in Figure 1 to that shown in Figure 2 (or from the dotted to the full line position shown in Figure 2), a greater length of the rearmost end portion of the upper leaf is contacted thereby shortening the effective length of spring 4 and thereby increasing its stiffness. Secondly, the increase in radius of spring 12 will greatly increase this action, thus will eliminate the possibility of breakage of the end of the upper leaf of spring 4 which is a relatively weak point. Upon removal of the additional load on the frame, the arcuate spring will roll back to its initial position and will assume a smaller radius, thereby contacting very little of the upper end portion of the top leaf of spring 4 and thus allowing the top leaf to come into play throughout its entire length giving more flexibility and a softer ride.

It will be seen, therefore, that the action of the spring 4 as influenced by arcuate element 12 and the shackle linkage arrangement is to move the load bearing point in a direction towards the center of the spring as the result of additional loading of the frame or as the result of rebound of the rear wheels from a road obstacle, and vice versa, that is, to move the load bearing point towards the end of the spring by rolling and winding of spring 12 caused by removal of the additional load, or movement away of the spring 4 from the frame following tensioning or straightening of spring 4. Thus, the effective length of the spring is shortened at times of heavy loading of the frame so as to increase stiffness, and is lengthened upon removal of such load to allow the entire length of the upper leaf to come into play and to give a softer ride.

While the vehicle spring suspension has been described as being applicable to a rear wheel suspension, it will be apparent that it is also useful for a front wheel suspension.

Although a single linkage, including an arcuate spring is shown at the rear end of the spring 4, it will be apparent that, if desired, two such linkages as well as two such arcuate members may be used instead, one at each end of the spring 4, in which case, the forward linkage will be the reverse of the rear linkage. That is to say, shackles 14 will be closer together than shackles 10.

It will also be apparent that if the additional resilience provided by arcuate spring 12 is not needed as a helper spring, it may be made of stiff material which will not reduce in radius as the result of loading and will merely roll on the upper leaf to change the effective length thereof in response to loading.

Thus it will be seen that I have provided an efficient and relatively simple vehicle spring suspension which will automatically vary the length of the spring in response to loading or rebound from road irregularities in order to increase the stiffness of the spring in response to heavy loading and thus prevent the possibility of breakage at the weakest point, namely, the end of the upper leaf, and to allow the full length of the upper leaf to come into play at the moment the additional loading is removed so as to increase the resilience of the spring and the softness of the ride; furthermore, I have provided a spring suspension which greatly stabilizes a car, particularly when travelling around bends, thus being a great aid to knee action cars, particularly, which have a tendency to become unstable around bends; furthermore, I have provided a shackle means for a vehicle spring suspension with means for initially varying the degree of stiffness of the spring or the softeness of the ride by mere adjustment of the length of one of the links thereof, thereby making the spring suitable for widely different loads, therefore being particularly suitable for vehicle suspensions for trailers, semi-trailers and trucks.

While I have illustrated and described several embodiments of my invention, it will be understood that these are by way of illustration only, and that various changes and modifications may be made within the contemplation of my invention and within the scope of the following claims.

I claim:

1. A vehicle spring suspension comprising a multi-leaf spring for supporting an axle substantially centrally thereof, one end of said spring being pivotally mounted directly to the frame of the vehicle and the other end including shackle means connected to a longitudinally spaced point on said frame, said shackle means including a link whose ends are pivotally connected to the end of said spring and to said frame, an arcuate element of shorter radius than the spring and having one end supported on the top of one end portion of the spring and pivotally connected thereto, said arcuate member having a rolling movement on said end portion of the spring, said shackle means also including a link pivotally connected to the other end of said arcuate element, and a second link pivotally connected to the other end of said last mentioned link and to said first mentioned pivotally connected end of said spring, and a third link for connecting an intermediate portion of said second link to said frame, whereby rolling moving of said arcuate element takes place on said end portion of the spring as the result of loading of said frame to shorten the effective length of said spring.

2. A vehicle suspension as recited in claim 1 wherein said arcuate element is in the form of a leaf spring whose radius increases so as to contact a greater length of said spring end portion as the result of loading of said frame.

3. A vehicle suspension as recited in claim 1 wherein said third link includes means for adjusting the length thereof between the point of connection to the frame and the point of connection to said second link.

4. A vehicle spring suspension comprising a leaf spring, a shackle linkage for connecting one end of said spring to the frame of a vehicle, said shackle linkage comprising a shackle element pivotally connected to the said spring end and to said frame, an arcuate element having an end portion partially encircling the pivotal connection between said shackle and spring end, a second shackle element having one end pivotally connected to the other end of said arcuate element, a link connecting the other end of said second shackle and to the said pivotal connection at the end of said spring, and a second link pivotally mounted at one end to the upper end of said first shackle and at its lower end to an intermediate portion of said first link, said arcuate element having a rolling movement on the top end portion of said spring adjacent said first shackle so as to displace the load bearing point and shorten the effective length of said spring in response to increase in loading to increase its stiffness.

5. Apparatus recited in claim 4 wherein said arcuate element is in the form of a leaf spring of substantially shorter radius than the uppermost leaf of said vehicle spring so that upon loading of said frame or upon compression of said spring, the radius of said arcuate element will increase, thus increasing the length of contact between said arcuate element and the upper end portion of said spring, and wherein said second link is of adjustable length for initially varying the length of contact between said arcuate element and said upper end portion of said spring.

References Cited in the file of this patent
UNITED STATES PATENTS

| | | |
|---|---|---|
| 1,107,964 | King | Aug. 18, 1914 |
| 1,699,435 | Kearns | Jan. 15, 1929 |
| 1,858,930 | Hoover | May 17, 1932 |

FOREIGN PATENTS

| | | |
|---|---|---|
| 453,647 | Germany | Dec. 12, 1927 |